US008413556B2

(12) United States Patent
Chuang

(10) Patent No.: US 8,413,556 B2
(45) Date of Patent: Apr. 9, 2013

(54) COMBINATION OF TIRE TOOL AND TOOL SET

(76) Inventor: Louis Chuang, Taichung (TW)

( * ) Notice: Subject to any disclaimer, the term of this patent is extended or adjusted under 35 U.S.C. 154(b) by 352 days.

(21) Appl. No.: 12/815,490

(22) Filed: Jun. 15, 2010

(65) Prior Publication Data

US 2010/0319495 A1 Dec. 23, 2010

(30) Foreign Application Priority Data

Jun. 23, 2009 (TW) ............................... 98120936 A

(51) Int. Cl.
*B25F 1/00* (2006.01)
*B25B 23/00* (2006.01)
*B60C 25/02* (2006.01)

(52) U.S. Cl. .................... 81/440; 157/1.3; 7/138; 7/168

(58) Field of Classification Search .................... 81/440, 81/177.4, 436–439; 7/118, 128, 138, 168; D8/21, 31, 62, 88, 105, 107; 157/1.3
See application file for complete search history.

(56) References Cited

U.S. PATENT DOCUMENTS

| | | | | |
|---|---|---|---|---|
| D470,738 | S * | 2/2003 | Kao | D8/105 |
| 6,751,819 | B2 | 6/2004 | Chuang | |
| 6,751,820 | B1 * | 6/2004 | Wu | 7/118 |
| 7,810,415 | B2 * | 10/2010 | Adamany et al. | 81/440 |
| 7,900,540 | B1 * | 3/2011 | Te | 81/440 |

* cited by examiner

*Primary Examiner* — Hadi Shakeri
(74) *Attorney, Agent, or Firm* — Alan Kamrath; Kamrath IP Lawfirm, P.A.

(57) ABSTRACT

A combination of a tire tool and a tool set includes its tire tool including two connecting lugs extending therefrom and with one connecting lug opposed to and spaced from the other, and a working section defined thereon. The two connecting lugs define a width extending in a direction transverse to a longitudinal direction of the tire tool. The combination includes its tool set including a housing member including two plates connected to each other in a spaced relationship and with one plate separated from the other in a first direction. The two plates include a space defined therebetween and define two openings and with one opening opposed from the other in a second direction transverse to the first direction. The tool set further includes a fixing device extending between and engaging with the two plates.

15 Claims, 14 Drawing Sheets

COMBINATION OF TIRE TOOL AND TOOL SET

BACKGROUND OF THE INVENTION

1. Field of the Invention

The present invention relates to a combination of a tire tool and a tool set and, in particular, to a tire tool that facilitates the removal of a tire from a wheel rim.

2. Description of the Related Art

Referring to U.S. Pat. No. 6,751,819, entitled to the applicant of this application for patent, that discloses a tire lever which is used for removing a tire from a wheel rim is provided on a tool assembly. The tire lever is detached from the tool set for the removal of the tire and is stored thereon when not in use. Therefore, the user has no need to bring a tire lever and a tool assembly separately. Specifically, the tire lever is mounted on a housing member of the tool assembly at a position where it will not interfere the operation of other tools of the tool set that pivotally connects to the housing member and will not have an effect of preventing the user to hold the housing member ergonomically.

U.S. Pat. No. 6,751,819 discloses a tire lever, used for removing a tire from a wheel rim, provided on a tool assembly. The tire lever is detached from the tool set for the removal of the tire and is stored thereon when not in use. Therefore, the user has no need to bring a tire lever and a tool assembly separately. Specifically, the tire lever is mounted on a housing member of the tool assembly at a position where it will not interfere with the operation of other tools of the tool set pivotally connected to the housing member and will not have an effect of preventing the user to hold the housing member ergonomically.

Generally, removing the tire from the wheel rim requires a step that the user rotates the tire lever along the wheel rim. However, it is always never too easy and requires a great effort to do so. Therefore, there is still a desire to provide a tire lever that saves the user's effort to remove the tire from the wheel rim.

The present invention is, therefore, intended to obviate or at least alleviate the problems encountered in the prior art.

SUMMARY OF THE INVENTION

According to the present invention, a combination of a tire tool and a tool set includes its tire tool including a proximal end including two connecting lugs extending therefrom, with one connecting lug opposing to and spaced from the other. The tire tool also includes a distal end including a working section defined thereon. The tire tool includes a longitudinal length extending from the proximal end to the distal end, and the two connecting lugs define a width extending in a direction transverse to the longitudinal direction of the tire tool. The combination includes its tool set including a housing member including two plates connected to each other in a spaced relationship, with one plate separated from the other in a first direction. The two plates includes a space defined therebetween and defining two openings, with one opening opposing the other in a second direction transverse to the first direction. The tool set further includes a fixing device extending between and engaging with the two plates. Furthermore, the tire tool is connected to the fixing device on the housing member by connecting the two connecting lugs to the fixing device and is operably pivotal between a retracted position with the tire tool disposed between the two plates of the housing member and an exposed position with the tire tool disposed outside the two plates of the housing member. Moreover, the housing member of the tool set is gripped as a handle while operating the tire tool.

It is an object of the present invention to provide a combination of a tire tool and a tool set.

It is another object of the present invention to provide a combination of a tire tool and a tool set. When using the tire tool as a lever to remove a tire from a wheel rim, the user can hold the tool set to alleviate a problem that a length of force-applying arm defined from a longitudinal length thereof is reduced when the user holds on the tire tool and another problem that the tire tool would distort and break a connection with the fixing device due to an insufficient rigid structural connection with the fixing device when suffering a large counterforce during operation.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
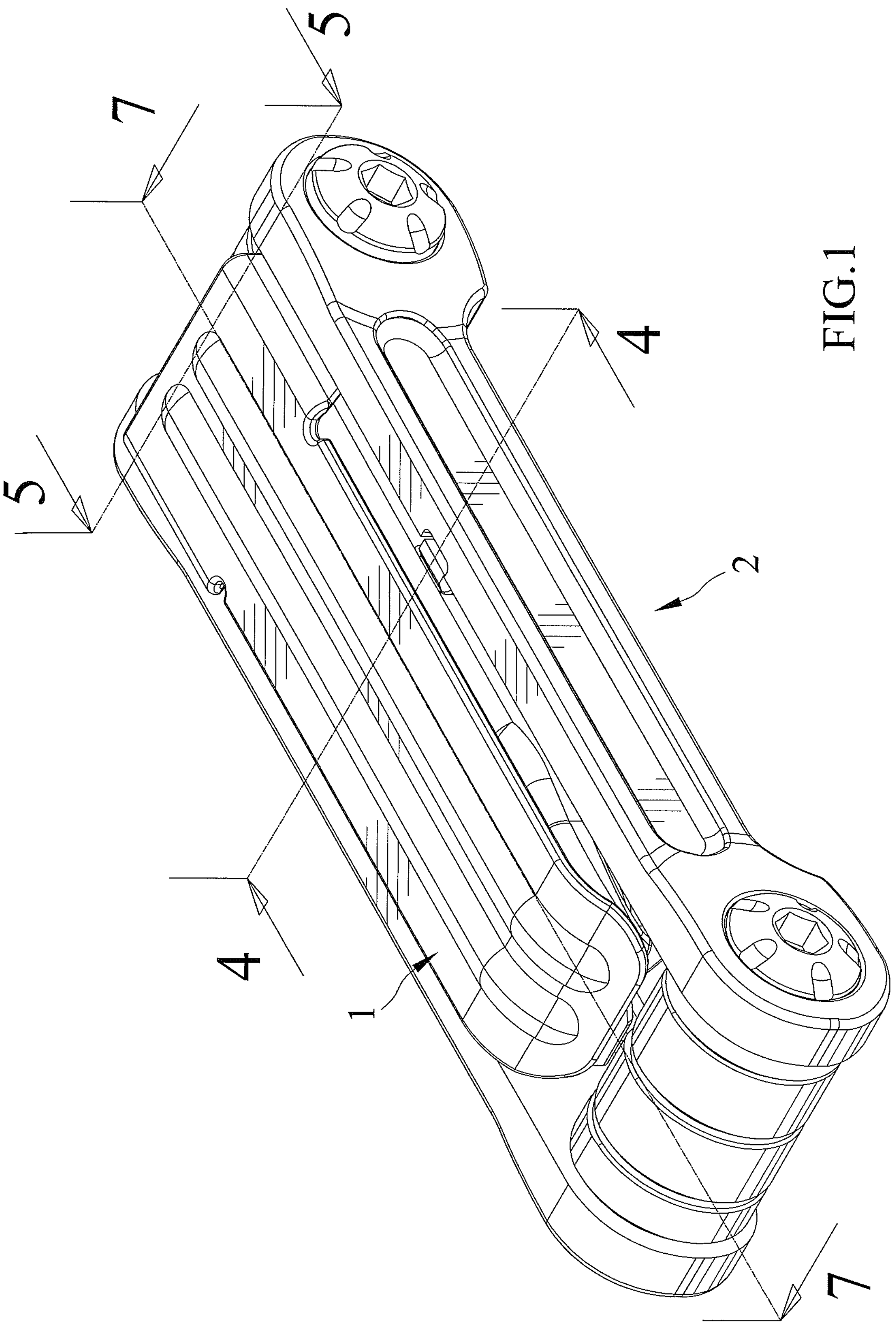
FIG. 1 is a perspective view of a combination of a tire tool and a tool set in accordance with a first embodiment of the present invention, with the tire tool in a retracted position.
Figure 2:
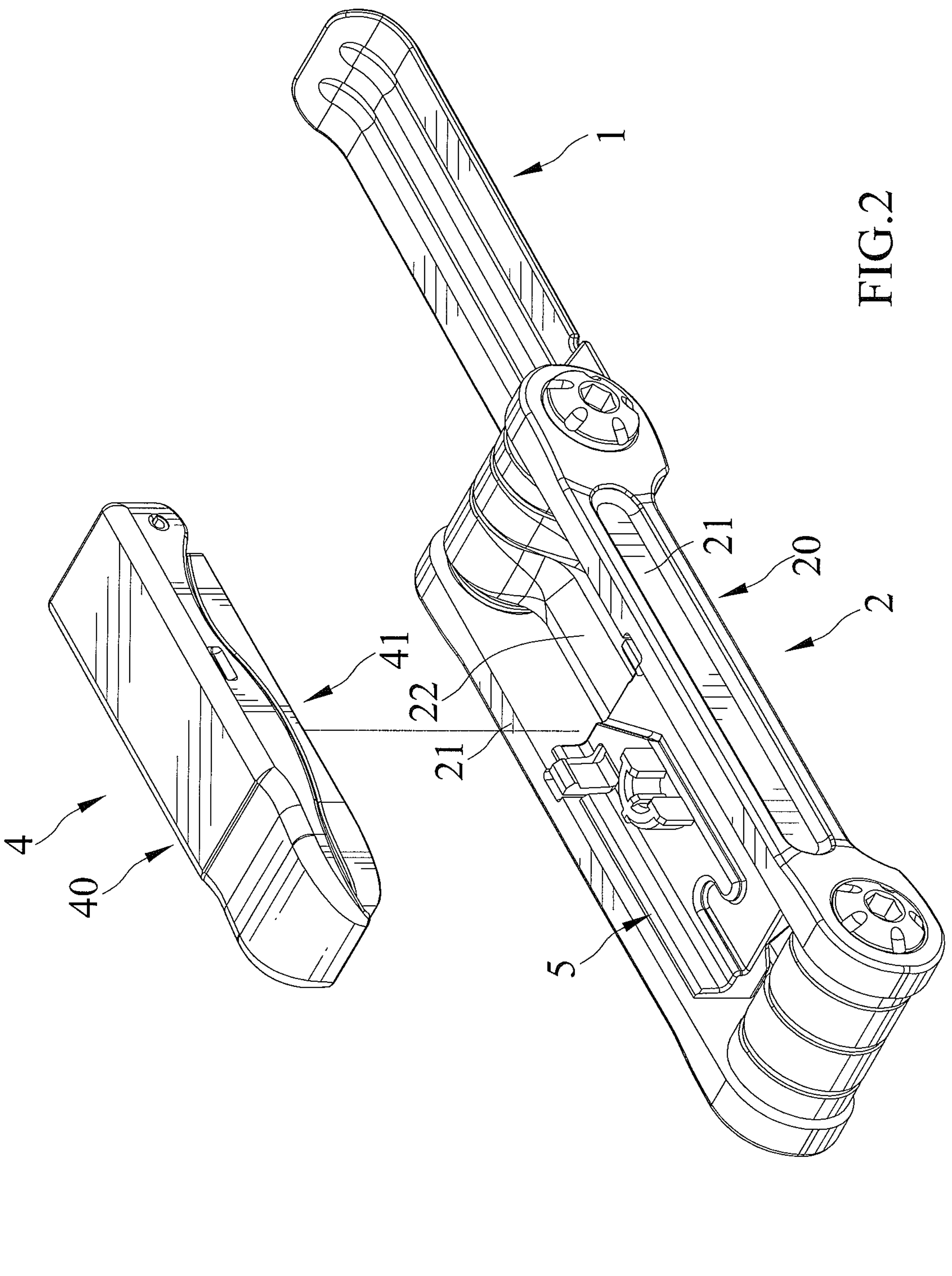
FIG. 2 is a perspective view showing the tire tool in an exposed position and a collapsible tire lever receivable in the tool set.
Figure 3:
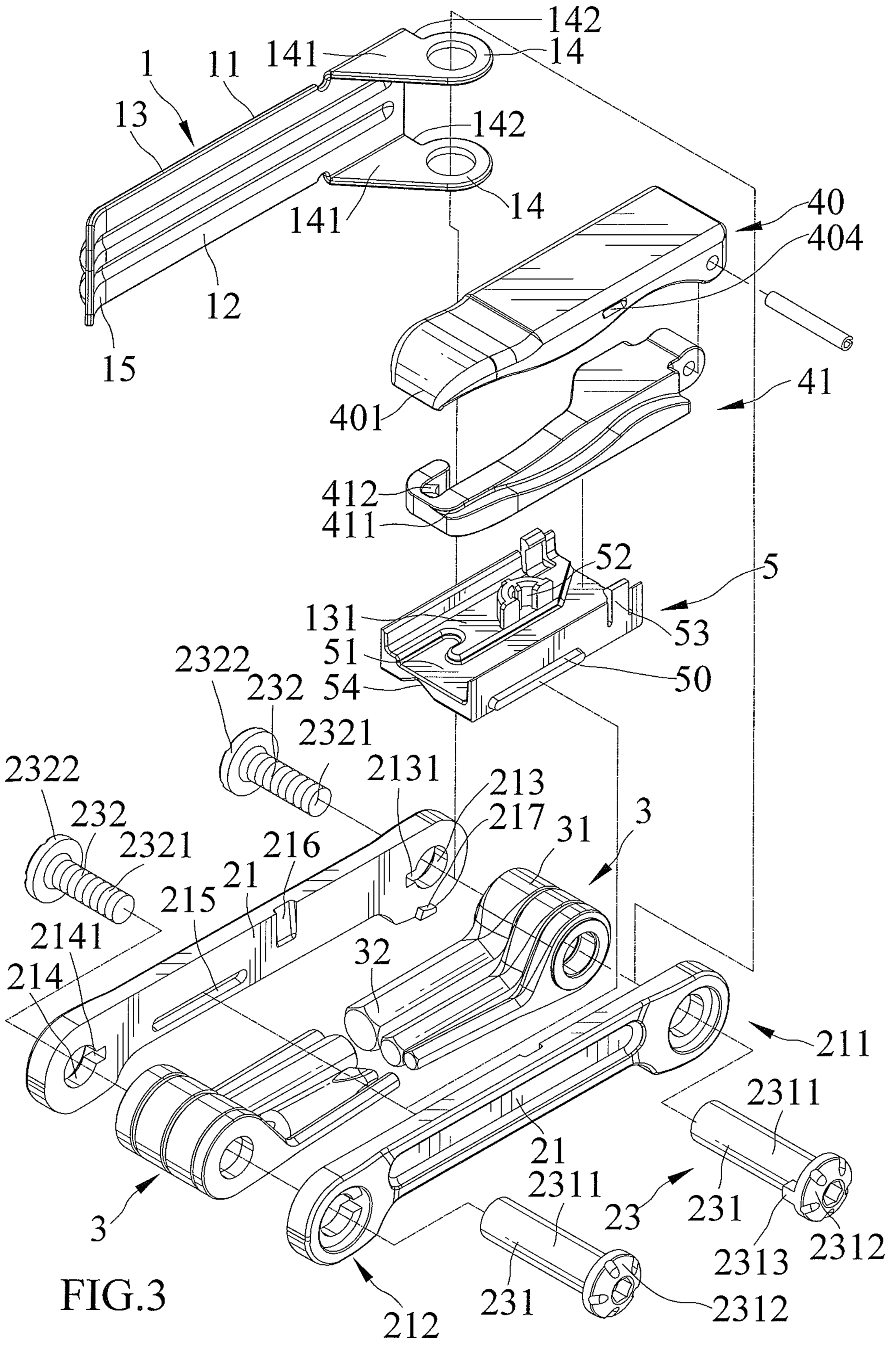
FIG. 3 is an exploded perspective view of the combination of the tire tool and tool set as well as the tire lever shown seen in FIG. 2.
Figure 4:
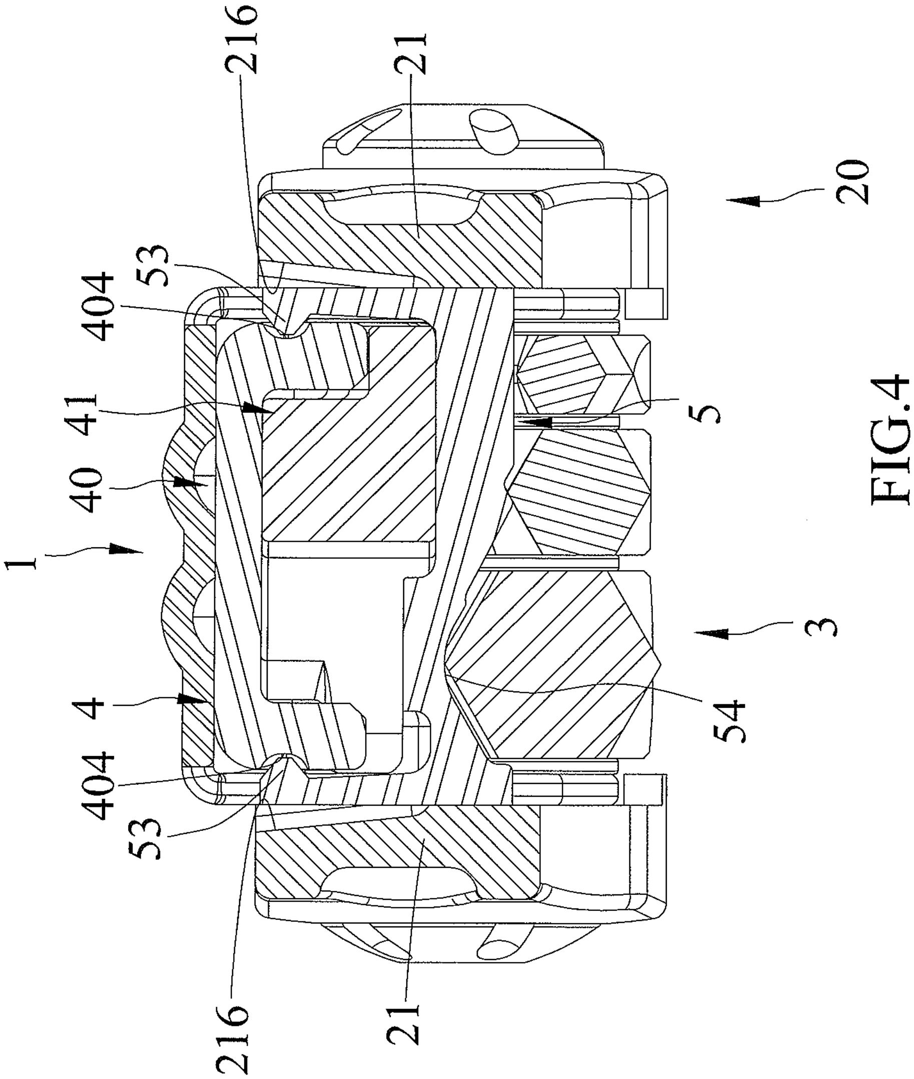
FIG. 4 is a cross-sectional view taken along line 4-4 of FIG. 1.
Figure 5:
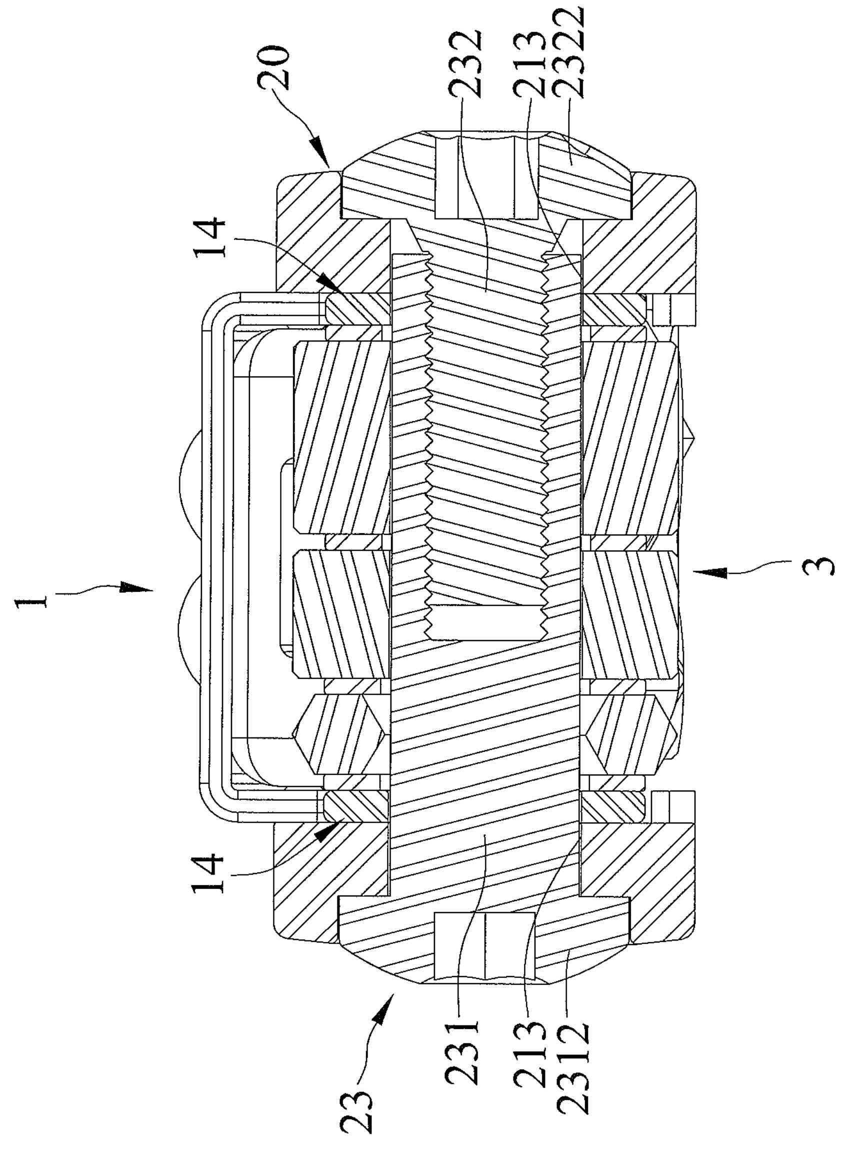
FIG. 5 is a cross-sectional view taken along line 5-5 of FIG. 1.
Figure 6:
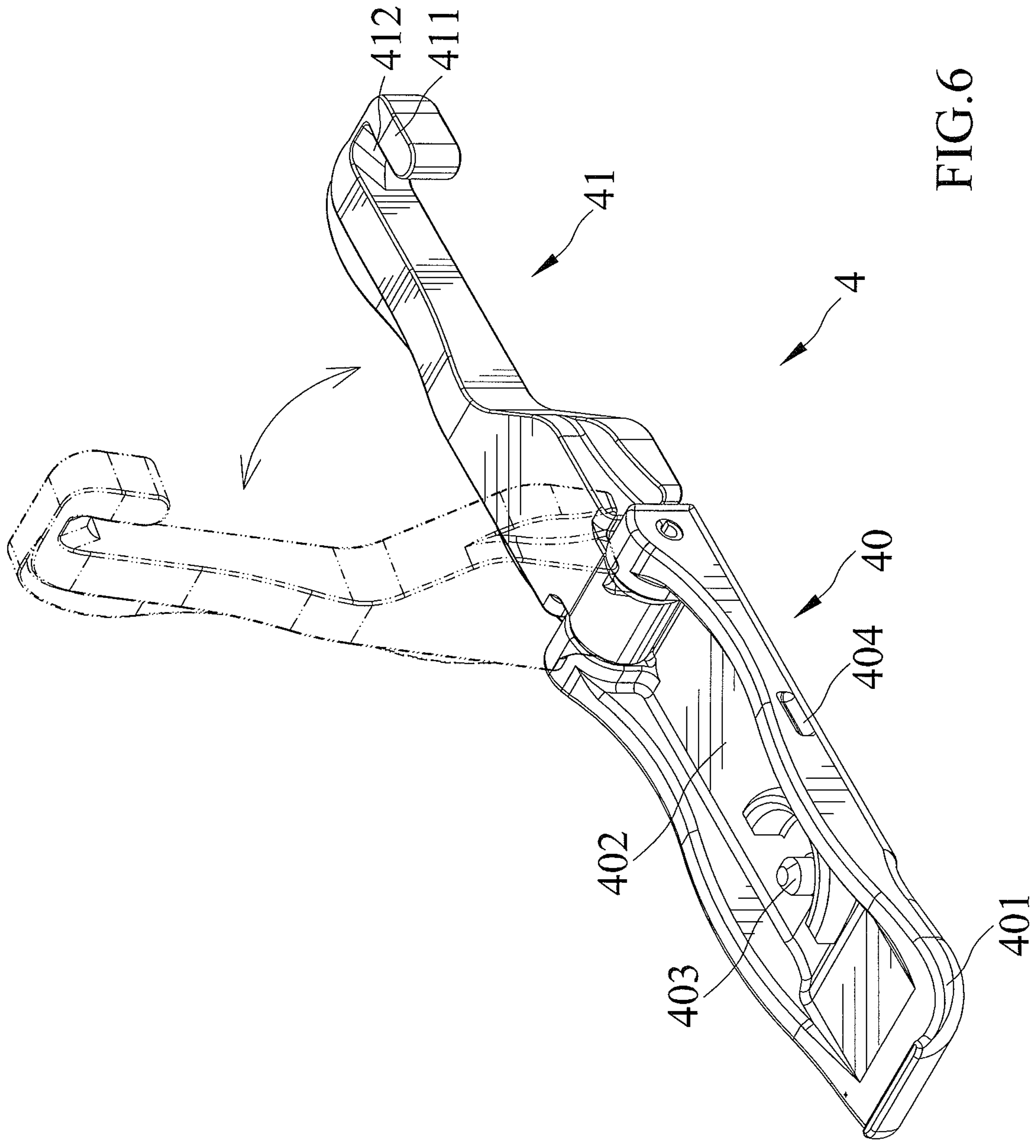
FIG. 6 is a perspective view showing the operation of the tire lever seen in FIG. 2.
Figure 7:
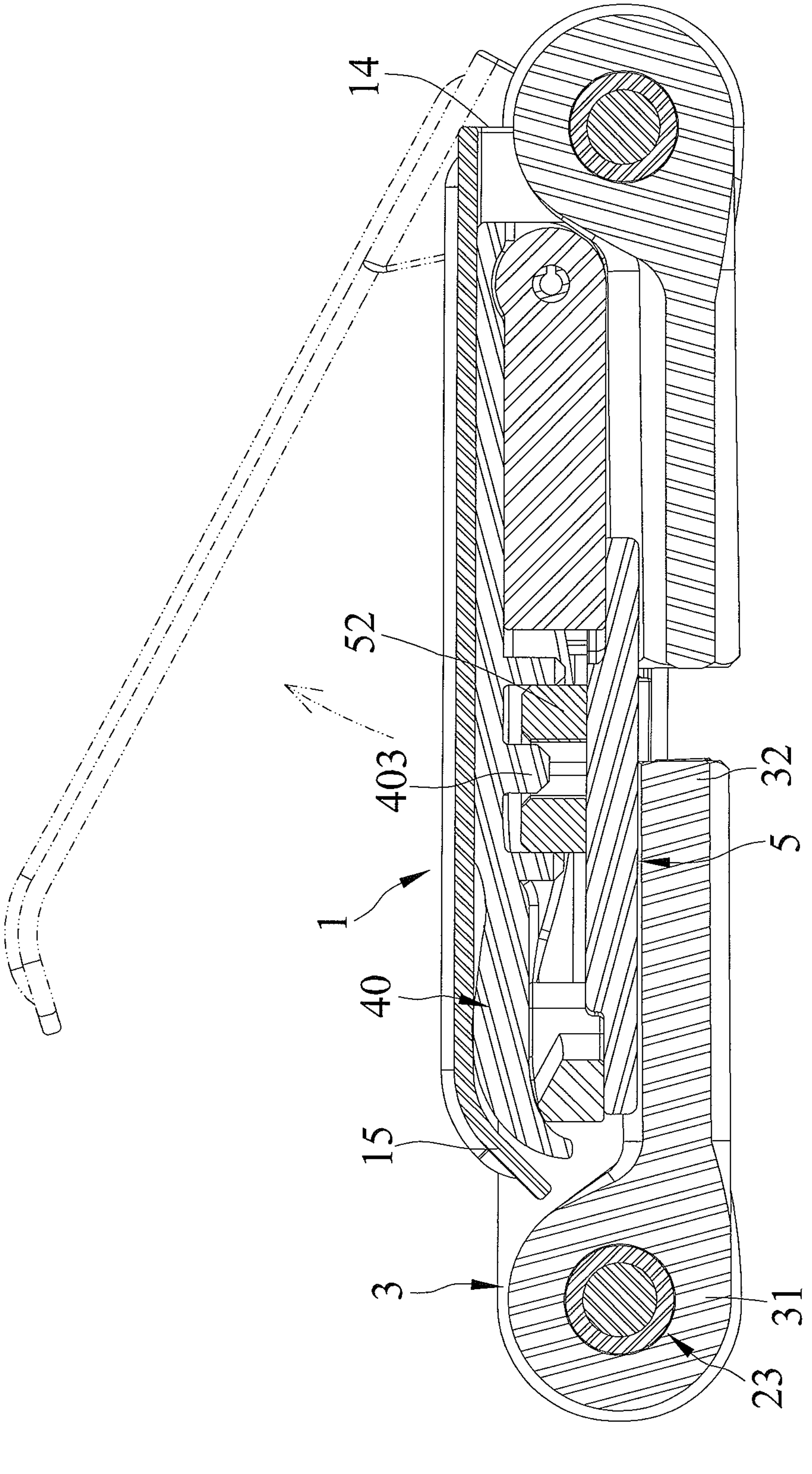
FIG. 7 is a cross-sectional view taken along line 7-7 of FIG. 1 and shows the tire lever seen in FIG. 2 retained in the tool set by the tire tool and also shows the tire tool adapted to be moved to a position away from the retracted position, with the tire tool shown in phantom.
Figure 8:
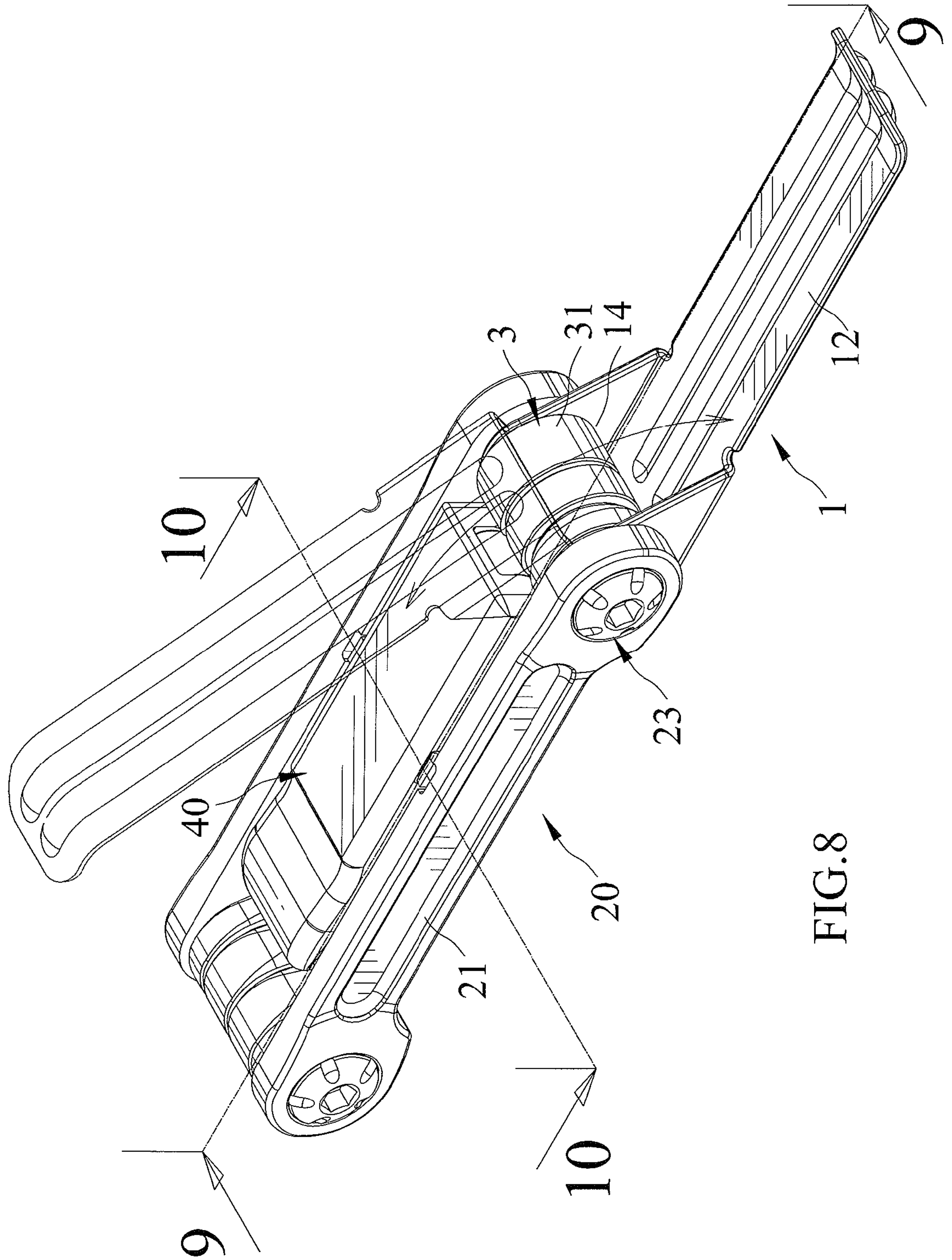
FIG. 8 is a perspective view showing the tire tool in the exposed position and the collapsible tire lever received in the tool set and also shows the tire tool adapted to be moved to a position away from the retracted position, with the tire tool shown in phantom.
Figure 9:
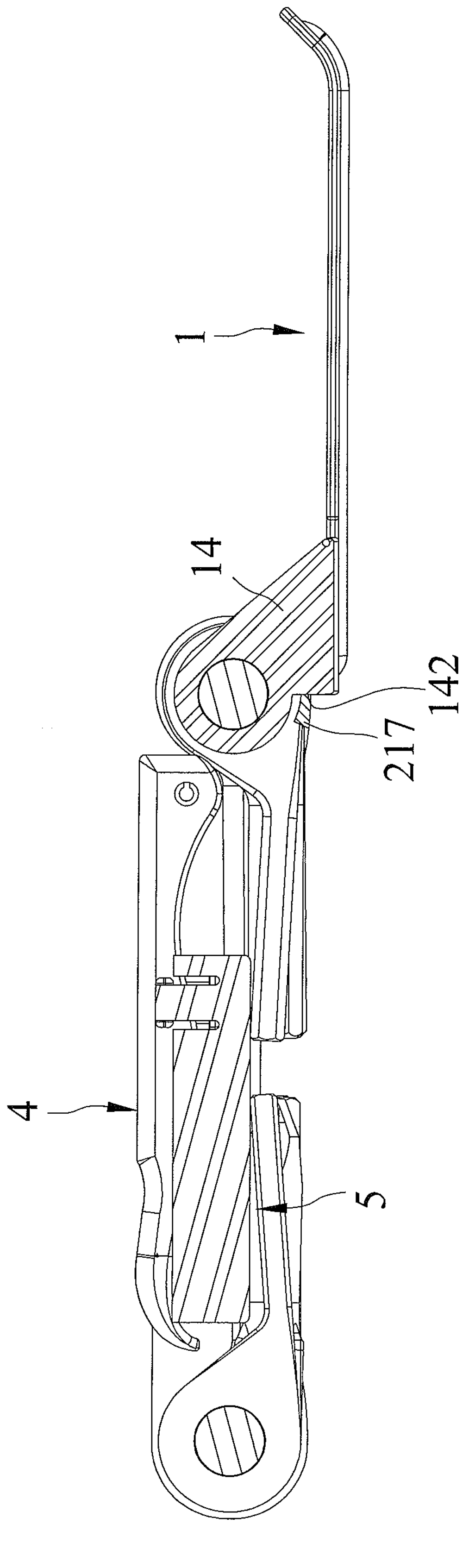
FIG. 9 is a cross-sectional view taken along line 9-9 of FIG. 8.
Figure 10:
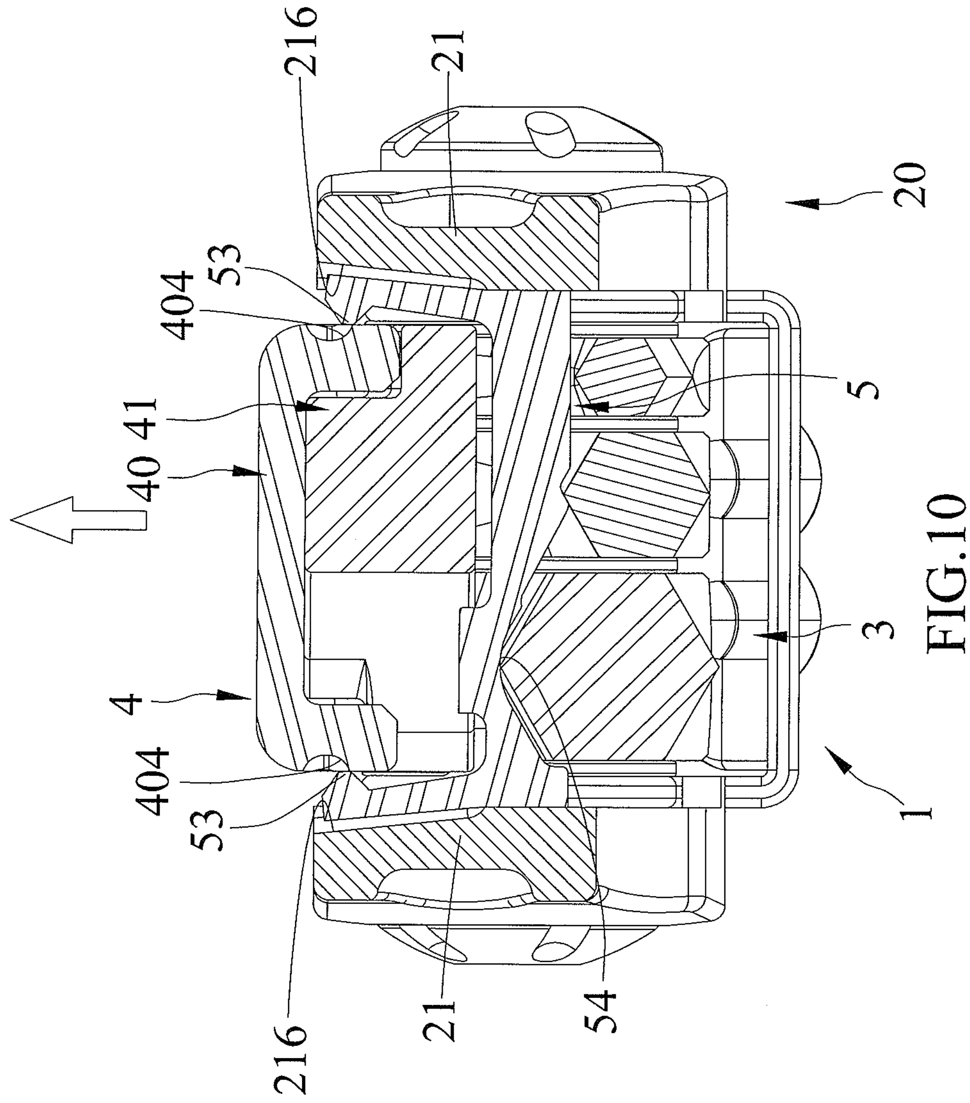
FIG. 10 is a cross-sectional view taken along line 10-10 of FIG. 8 and shows an arrow indicating that the tire lever is removable from the tool set.
Figure 11:
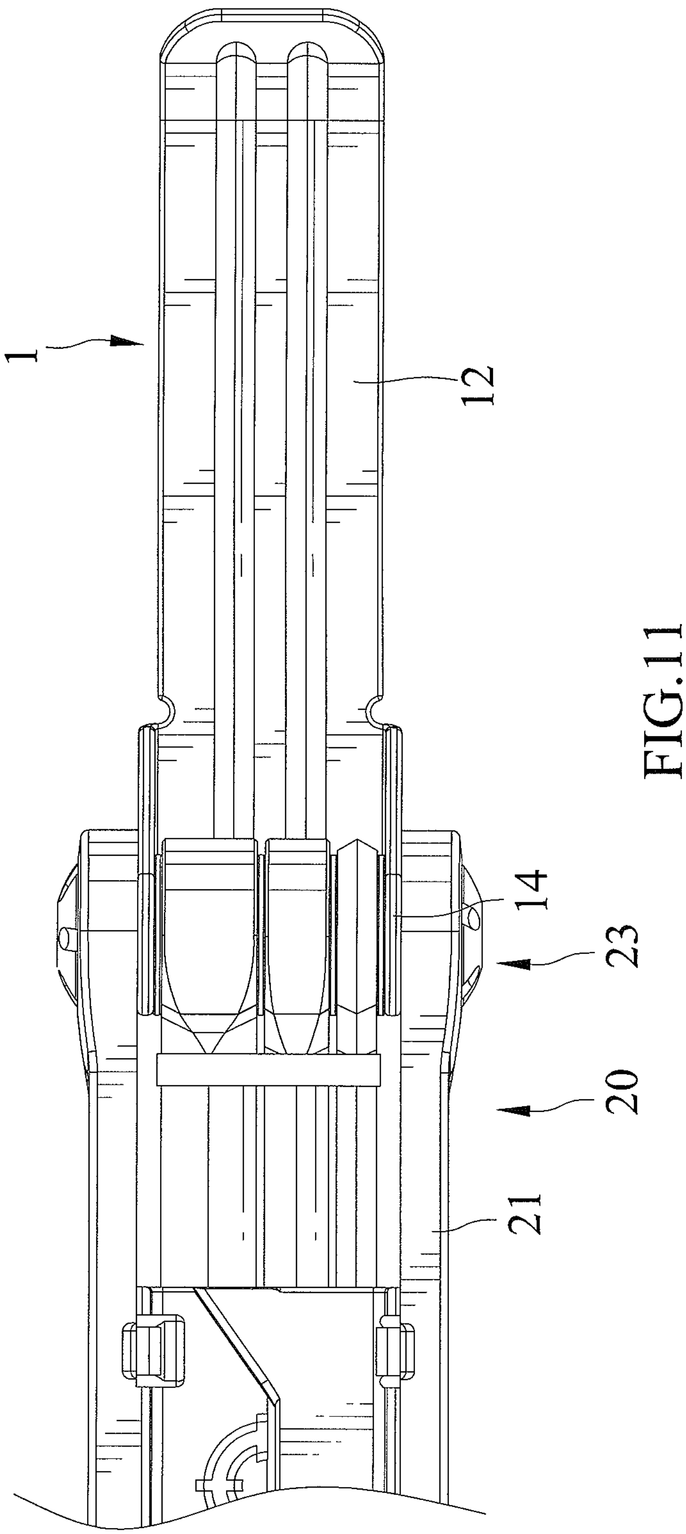
FIG. 11 is a partial, top view of the combination of the tire tool and tool set as well as the tire lever shown in FIG. 8.
Figure 12:
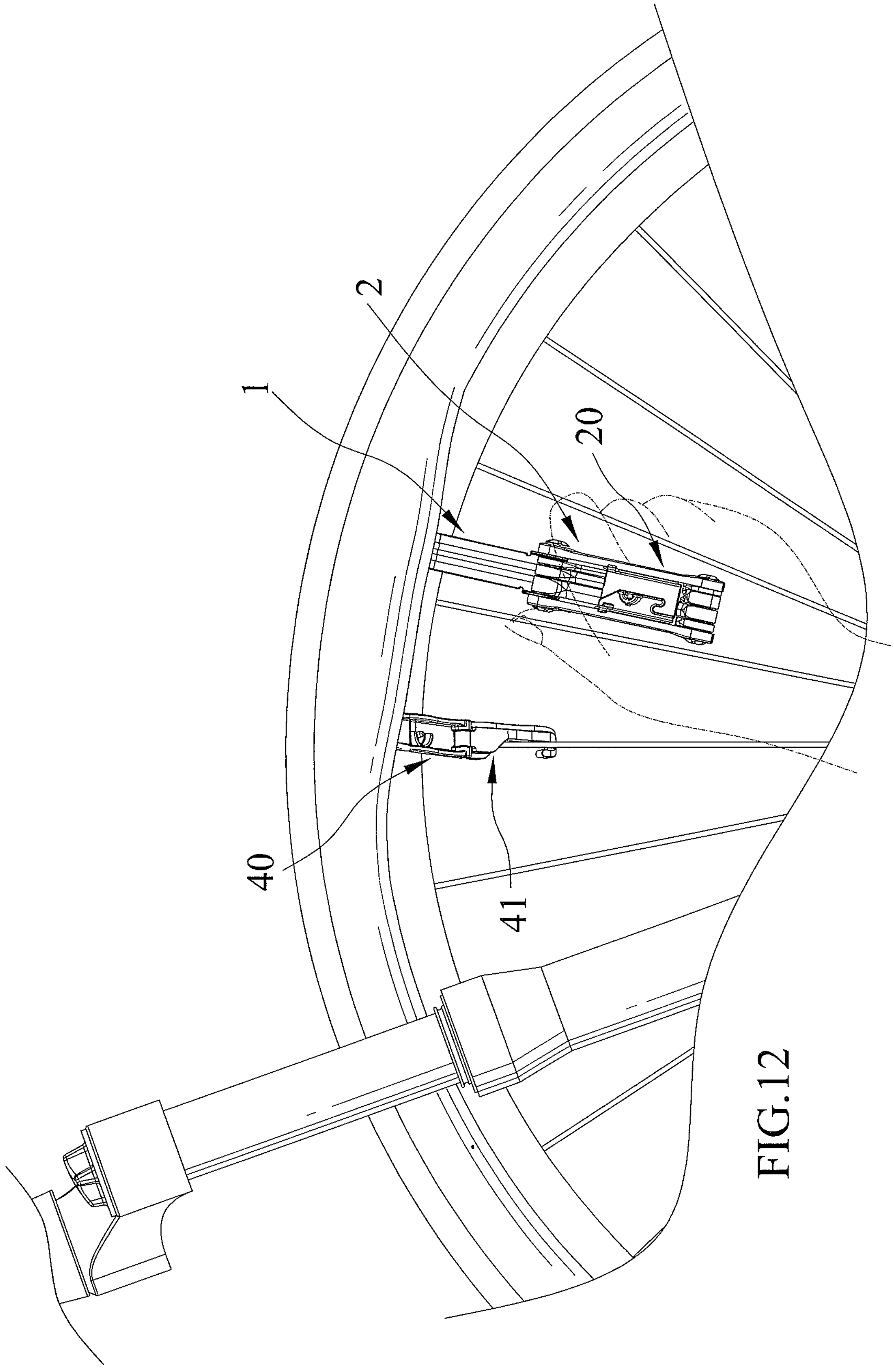
FIG. 12 show a hooking end of the tire lever anchored to a spoke of a wheel rim and a prying end of the tire lever wedged under the bead of a tire and also shows the tire tool wedged under the bead of the tire for removing the tire from the wheel rim.

FIGS. 1 through 12 show a combination of a tire tool 1 and a tool set 2 in accordance with a first embodiment of the present invention. The tire tool 1 is made of one material. Preferably, the tire tool 1 is made of metal. The tire tool 1 includes a proximal end and a distal end and extends longitudinally from the proximal end to the distal end. Also, the tire tool 1 includes a top surface 11 and a bottom surface 12 opposite to the top surface 11 and both extending in a first plane. The tire tool 1 further includes two lateral surfaces 13 extending from the top surface 11 to the bottom surface 12. Each lateral surface 13 extends longitudinally from the proximal end to the distal end of the tire tool 1. Additionally, the two lateral surfaces 13 are spaced from each other at a distance defining a first width extending in a direction transverse to a longitudinal direction of the tire tool 1. Moreover, the tire tool 1 includes two connecting lugs 14 extending therefrom. Each connecting lug 14 includes two lateral sides 141 opposing each other, and the two connecting lugs 14 are opposed to and spaced from each other and define a width extending in a direction transverse to the longitudinal direction of the tire tool 1. Furthermore, the two connecting lugs 14 are disposed adjacent to the proximal end of the tire tool 1. The tire tool 1 further includes a working section 15 defined at the distal end thereof used to wedge under and pry the bead of a tire off a wheel rim during operation thereof. Furthermore, the top surface 11 and bottom surface 12 defining the working section 15 are curved to an extent to ease the user to wedge and to pry the tire. Therefore, the working section 15 has a cross section which is curved.

The tool set 2 includes a housing member 20 including two plates 21 connected to each other in a spaced relationship, and one plate 21 is separated from the other in a first direction. Therefore, the two plates 21 include a space 22 defined therebetween separating the plates 21. Each plate 21 includes a proximal end 211 and a distal end 212 and extends from the proximal end 211 to the distal end 212. The space 22 defines two opposite openings with one opening opposing the other in a second direction transverse to the first direction. Also, each plate 21 includes a proximal end 211 and a distal end 212, with a first engaging hole 213 extending through the proximal end 211 and a second engaging hole 214 extending through the distal end 212, respectively. Two fixing devices 23 extend between and engage with the two plates 21, with one fixing device 23 engaged in the first engaging holes 213 of the plates 21 while the other engaged in the second engaging holes 214 of the plates 21. Each first engaging hole 213 and second engaging hole 214 is a countersink hole. Each fixing device 23 includes a first fastener 231 and a second fastener 232. The first fastener 231 includes a tubular body 2311 with an inner thread and an enlarged head 2312 at a distal end of the tubular body 2311, and the second fastener 232 includes a shank 2321 with an outer thread and an enlarged head 2322 at a distal end of the shank 2321. Each first fastener 231 is coupled with each second fastener 232. Specifically, the fixing device 23 engaging the first engaging holes 213 of the two plates 21 has its first fastener 231 having its enlarged head 2312 retained in the first engaging hole 213 of one plate 21 and its tubular body 2311 disposed in the space 22 between the plates 21 and has its second fastener 232 having its enlarged head 2322 retained in the first engaging hole 213 of the other plate 21 and its shank 2321 engaged in the tubular body 2311 of the associated first fastener 231. Likewise, the fixing device 23 that engages the second engaging holes 214 of the two plates 21 has its first fastener 231 having its enlarged head 2312 retained in the second engaging hole 214 of one plate 21 and its tubular body 2311 disposed in the space 22 between the plates 21 and its second fastener 232 having its enlarged head 2322 retained in the second engaging hole 214 of the other plate 21 and its shank 2321 engaged in the tubular body 2311 of the associated first fastener 231. Additionally, each first fastener 231 is prevented from rotating to disengage from the associated second fastener 232. In the preferred embodiment, each first engaging hole 213 includes a slot 2131 communicating therewith, and the fixing device 23 engaging the first engaging holes 213 of the two plates 21 has its first fastener 231 including a protrusion 2313 extending therefrom and engaging in the slot 2131 of the associated first engaging hole 213 to prevent it from rotating to disengage from the associated second fastener 232. Likewise, each second engaging hole 214 includes a slot 2141 communicating therewith, and the fixing device 23 engaging the second engaging holes 214 of the two plates 21 has its first fastener 231 including a protrusion 2313 extending therefrom and engaging in the slot 2141 of the associated second engaging hole 214 to prevent it from rotating to disengage from the associated second fastener 232.

The tool set further includes a plurality of tools 3 each pivotally connected to one fixing device 23 and disposed between the two plates 21 of the housing member 20. Each tool 3 includes a proximal end and a distal end and extends longitudinally from the proximal end to distal end. The proximal end includes a connecting end 31 formed for pivotally connecting it to the fixing device 23, with the connecting end 31 including an inner side being an even surface that enables the tool 3 to have a surface contact area with the associated fixing device 23, and the distal end includes a driving end 32 formed for performing a specific procedure. Also, each tool 3 is operably moveable between a retracted position disposed in the space 22 of the housing member 20 and an exposed position disposed outside the space 22, and each tool 3 is positioned in the retracted position when not in use and in the exposed position when in use.

The tire tool 1 is connected to one fixing device 23 on the housing member 20 by connecting the two connecting lugs 14 to the fixing device 23 and is operably pivotal between a retracted position disposed between the two plates 21 of the housing member 20 and an exposed position disposed outside the two plates of the housing member 20. The tire tool 1 is positioned in the retracted position when not in use and in the exposed position when in use. Therefore, when using the tire tool 1 as a lever to remove a tire from a wheel rim, the user can hold the housing member 20 to alleviate a problem that a length of force-applying arm defined from a longitudinal length thereof is reduced when the user holds on the tire tool 1 and another problem that the tire tool would distort and break a connection with the fixing device 23 due to an insufficient rigid structural connection with the fixing device 23 when suffering a large counterforce during operation thereof. Also, the tire tool 1 includes one of its connecting lugs 14 having one of its lateral sides 141 abutted against one plate 21 and the other of its connecting lugs 14 having one of its lateral sides 141 abutted against the other plate 21 to enhance the connection with the fixing device 23. Furthermore, the connecting lugs 14 are disposed between the two plates 21. In addition, the tire tool 1 is adapted to be pivoted away from the housing member 20 to an extent until it is stopped by a stopping edge. In the preferred embodiment, each plate 21 includes a stopping edge 217 defined thereon. The tire tool 1 includes one of its connecting lugs 14 including an abutting edge 142 defined thereon and that abuts against the stopping edge 217 of the associated plate 21 to stop the tire tool 1 from being further pivoted away from the housing member 20. Each stopping edge 217 is defined on an inner surface of the associated plate 21. Preferably, the tire tool 1 is pivotal away from the housing member 20 through an angle substantially equal to 180 degrees and to an extent that the tire tool 1 and the housing member 20 are aligned.

In addition, the combination of the tire tool 1 and the tool set 2 includes a tire lever 4 receivable in the tool set 2, i.e. between the two plates 21 of the housing member 20, and a fixture 5 installed between the two plates 21 to support the tire lever 4 in the tool set 2. When the tire tool 1 is in the retracted position, the fixture 5 is adapted to cover and retain the tire lever 4 in the tool set 2. The tire lever 4 includes a first body 40 including a proximal end and a distal end and extending longitudinally from the proximal end to the distal end. Also, the first body 40 includes a prying end 401 defined at the distal end thereof and used to wedge under and pry the bead of a tire off a wheel rim during operation of the tire lever 4. The prying end 401 is curved to an extent to ease the user to wedge and to pry the tire. Therefore, the prying end 401 has a cross section which is curved. The tire lever 4 further includes a second body 41 including a proximal end and a distal end and extending longitudinally from the proximal end to the distal end. Also, the second body 41 includes a hooking end 411 defined at the distal end thereof and used to anchor to a spoke of a wheel rim during operation of the tire lever 4. The hooking end 411 is a portion of the second body 41 that curves backward from its longitudinal direction and extends to an extent including a gap 412 defined therein. Moreover, the tire lever 4 includes its first body 40 and its second body 41 pivotally connected to each other at their proximal ends and is moveable between a collapsed position with the first body 40 and the second body 41 on top of each other and the second body 41 received in a cavity 402 defined in a bottom surface of the first body 40 and an extended position with the prying end 401 of the first body 40 separated from the hooking end 411 of the second body 41 and the second body 41 disposed outside the cavity 402. Also, the first body 40 is pivotal away from the second body 41 through an angle substantially equal to 180 degrees and to an extent that the first body 40 and the second body 41 are aligned.

The fixture 5 is made of one material, includes two lateral edges engaged with the two plates 21, respectively, and is prevented from sliding relative to the two plates 21. In the preferred embodiment, each plate 21 includes a groove 215 defined therein, and the fixture 5 includes two positioning members 50 extending outwardly from the two lateral edges thereof respectively. Each positioning member 50 is engaged in one groove 215 and has a corresponding shape with a shape of the groove 215. Also, the fixture 5 includes a first surface 131 and a second surface opposing to the first surface 131, and the tire lever 4 is supported on the first surface 131 when it is received in the housing member 20 of the tool set 2. Further, a first channel 51 is inset on the first surface 131 of the fixture 5 and is provided for the tire lever 4 to position in a predetermined position on the fixture 5. The tire lever 4 is further maintained in the predetermined position since the lever 4 includes its first body 40 including a male locking member 403 extending from the bottom surface thereof engaged in a female locking member 52 extending outwardly from the first surface 131 of the fixture 5. Additionally, the tire lever 4 is prevented from accidentally disengaging from the fixture 5. In the preferred embodiment, the fixture 5 includes two hooks 53 defined on its two lateral edges, respectively, and the two hooks 53 are resiliently moveable between a first position hooking in two apertures 404 defined on the first body 40 of the tire lever 4 to prevent the tire lever 4 from accidentally disengaging from the fixture 5 and a second position disengaging from the associated apertures 404 to allow the tire lever 4 to be released from the fixture 5. In order to allow engaging ends of the hooks 53 to move out of the associated apertures 404, each plate 21 includes a recess 216 inset therein and disposed corresponding to one hook 53. Further, a plurality of second channels 54 is inset on the second surface of the fixture 5 and is provided for the plurality of tools 3 to engage in.

It is an aspect of the present invention that the tire tool 1 is pivotal away from the housing member 20 upwardly while the plurality of tools 3 are pivotal away from the housing member 20 downwardly. Therefore, the pivoting of the tire tool 1 will not interfere with operation of any of the plurality of tools 3.

Figure 13:
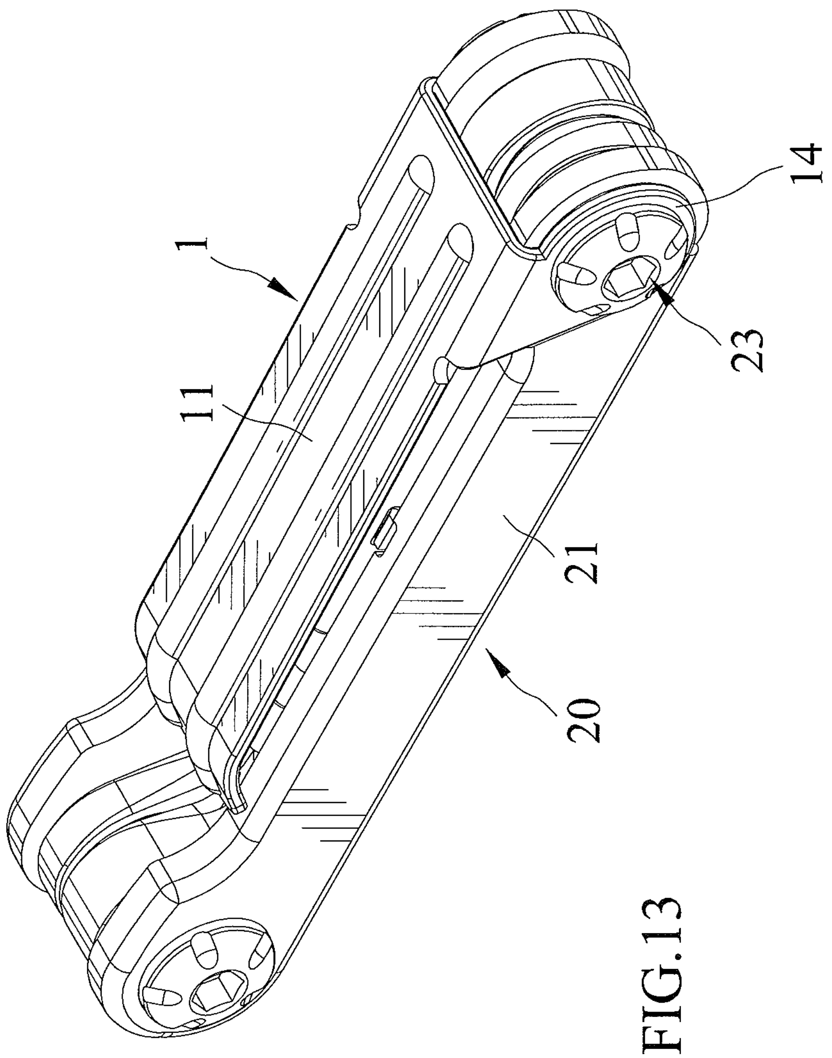
FIG. 13 is a perspective view of a combination of a tire tool and a tool set in accordance with a second embodiment of the present invention, with the tire tool in a retracted position.
Figure 14:
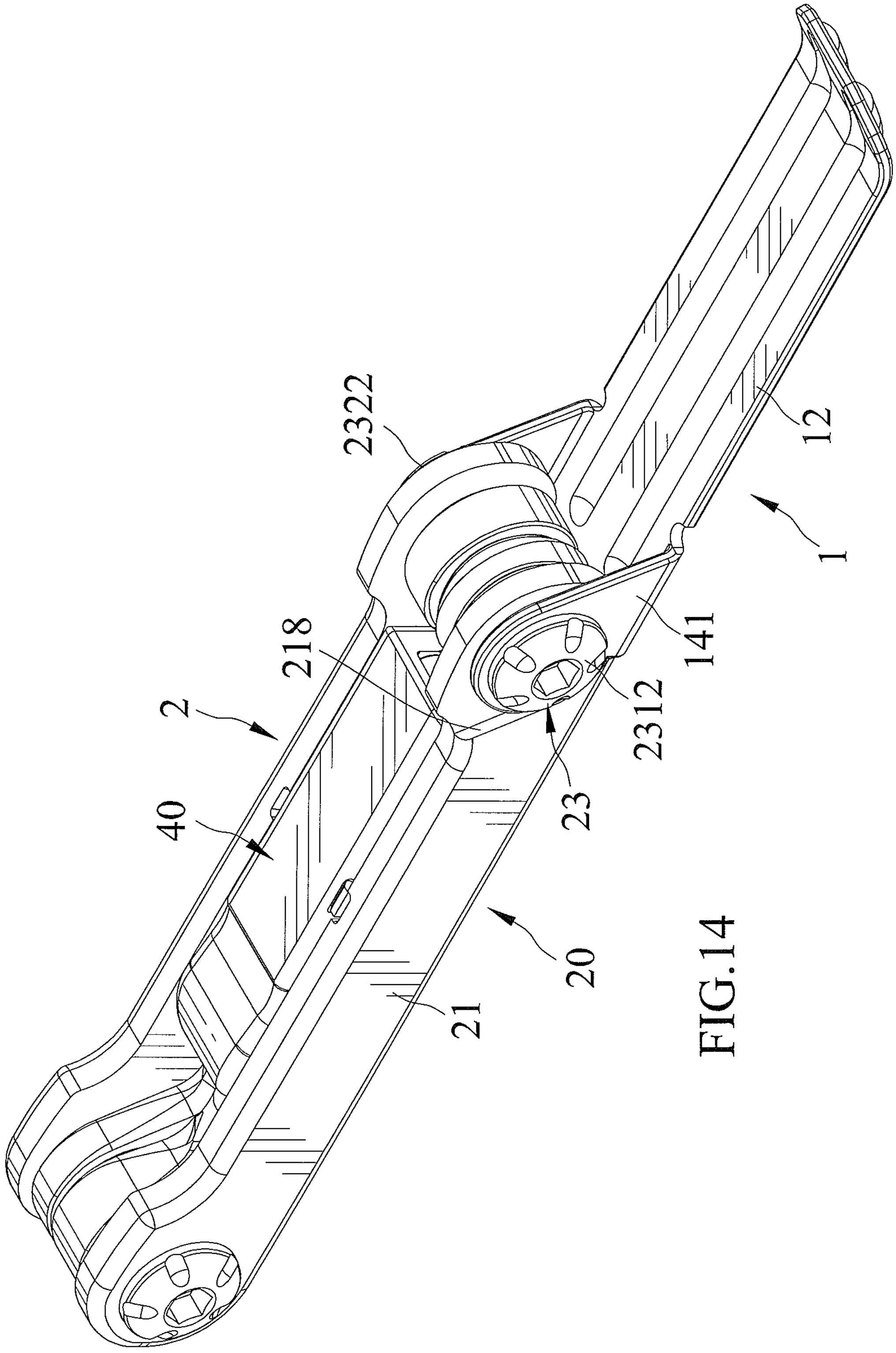
FIG. 14 is an extended perspective view of FIG. 13 and shows the tire tool in an exposed position and a collapsible tire lever received in the tool set.

FIGS. 13 and 14 show a second embodiment of the present invention. The second embodiment differentiates from the first embodiment in that the tire tool 1 includes one of its connecting lugs 14 having one of its lateral sides 141 abutted against an outer surface of one plate 21 and the other of its lateral sides abutted against the enlarged head 2312 of the first fastener 231 of the associated fixing device 23. The other of the connecting lugs 14 of the tool tire 1 has one of its lateral sides 141 abutted against an outer surface of the other plate 21 and the other of its lateral sides 141 abutted against the enlarged head 2322 of the second fastener 232 of the associated fixing device 23 to enhance the connection with the fixing device 23. Consequently, the tire tool 1 includes its two connecting lugs 14 disposed outside the two plates 21. Additionally, each plate 21 includes a slopped surface 218 formed on the outer surface, and the tire tool 1 includes one of its connecting lugs 14 including a sloped edge extending between the two lateral sides 141 of the connecting lug 14 conformly abutted against the sloped surface when it is in the retracted position.

In view of the forgoing, when using the tire tool 1 as a lever to remove a tire from a wheel rim, the user can hold the housing member 20 to alleviate a problem that a length of force-applying arm defined from a longitudinal length thereof is reduced when the user holds on the tire tool 1 and another problem that the tire tool would distort and break a connection with the fixing device 23 due to an insufficient rigid structural connection with the fixing device 23 when suffering a large counterforce during operation.

While the specific embodiments have been illustrated and described, numerous modifications come to mind without significantly departing from the spirit of invention, and the scope of invention is only limited by the scope of the accompanying claims.

What is claimed is:

1. A combination comprising:

a tire tool;

a tool set;

a proximal end of the tire tool including two connecting lugs extending therefrom and each including an abutting edge, with one connecting lug opposed to and spaced from the other, with a distal end of the tire tool including a working section defined thereon, with the tire tool including a longitudinal length extending from the proximal end to the distal end, and wherein the two connecting lugs define a width extending in a direction transverse to the longitudinal direction of the tire tool; and a housing member including two plates connected to each other in a spaced relationship, with one plate separated from the other in a first direction, with the two plates including a space defined therebetween and defining first and second openings, with the first opening opposite to the second opening in a second direction transverse to the first direction, with each plate including a stopping edge extending towards but spaced from the other plate and corresponding to a corresponding abutting edge, and with a fixing device extending between and engaging with the two plates;

wherein the tire tool is connected to the fixing device on the housing member by connecting the two connecting lugs to the fixing device and is operably pivotal about a pivot axis between a retracted position with the tire tool disposed in the first opening and between the two plates of the housing member and an exposed position with the tire tool disposed outside the two plates of the housing member; and wherein the housing member is gripped as a handle during operation the tire tool; and wherein the tool set comprises a plurality of tools pivotally connected to the fixing device and disposed between the two plates of the housing member, with each tool including a proximal end and a distal end and extending longitudinally from the proximal end to the distal end, with the proximal end of each tool including a connecting end formed for pivotally connecting each tool to the fixing device, with the distal end of each tool including a driving end formed for performing a specific procedure, with each tool operably pivotal about the pivot axis between a retracted position disposed in the second opening and the space of the housing member and an exposed position disposed outside the second opening and the space.

2. The combination as claimed in claim 1, wherein the connecting end of each of the plurality of tools includes an inner side being an even surface that enables each tool to have a surface contact area with the fixing device.

3. The combination as claimed in claim 1 further comprising a tire lever receivable between the two plates of the housing member, and wherein the tire lever is covered and retained by the tire tool when the tire lever is received between the two plates of the housing member.

4. The combination as claimed in claim 3, wherein the connecting end of each of the plurality of tools includes an inner side being an even surface that enables each tool to have a surface contact area with the fixing device.

5. The combination as claimed in claim 3 further comprising a fixture installed between the two plates to support the tire lever, wherein the tire lever is releasably engaged with the fixture, wherein the fixture includes two lateral edges engaged with the two plates, respectively, and is prevented from sliding relative to the two plates.

6. The combination as claimed in claim 5, wherein the fixture includes a first surface and a second surface opposite to the first surface, and wherein the tire lever is supported on the first surface when received between the two plates of the housing member.

7. The combination as claimed in claim 6, wherein the second surface includes a plurality of channels inset thereon, and wherein the plurality of tools is receivable in the plurality of channels, respectively.

8. The combination as claimed in claim 5, wherein the tire tool is pivotal away from the housing member upwardly and the plurality of tools are pivotal away from the housing member downwardly.

9. The combination as claimed in claim 5, wherein the fixture includes a hook defined thereon and resiliently moveable between a first position with the hook engaging with the tire lever to prevent the tire lever from accidentally disengaging from the fixture and a second position with the hook disengaged from the tire lever to allow the tire lever to be released from the fixture, and wherein one of the two plates includes a recess inset therein and disposed corresponding to the hook in order to provide a space allowing an engaging end of the hook to move out of the tire lever.

10. The combination as claimed in claim 1, wherein each of the two connecting lugs of the tire tool includes two lateral sides opposite to each other, and wherein the tire tool includes one of the two connecting lugs having one lateral side abutted against one of the two plates and another of the two connecting lugs having one lateral side abutted against another of the two plates to enhance connection with the fixing device.

11. A combination of a tire tool and a tool set comprising:

a proximal end of the tire tool including two connecting lugs extending therefrom, with one connecting lug opposed to and spaced from the other, with a distal end of the tire tool including a working section defined thereon, with the tire tool including a longitudinal length extending from the proximal end to the distal end, and wherein the two connecting lugs define a width extending in a direction transverse to the longitudinal direction of the tire tool;

a housing member of the tool set including two plates connected to each other in a spaced relationship, with one plate separated from the other in a first direction, with the two plates including a space defined therebetween and defining two openings, with one opening opposed to the other in a second direction transverse to the first direction, and with a fixing device extending between and engaging with the two plates;

wherein the tire tool is connected to the fixing device on the housing member by connecting the two connecting lugs to the fixing device and is operably pivotal between a retracted position with the tire tool disposed between the two plates of the housing member and an exposed position with the tire tool disposed outside the two plates of the housing member;

wherein the housing member of the tool set is gripped as a handle during the operating the tire tool;

a tire lever receivable between the two plates of the housing member, and wherein the tire lever is covered and retained by the tire tool when the tire lever is received between the two plates of the housing member; and a fixture installed between the two plates to support the tire lever, wherein the tire lever is releasably engaged with the fixture, wherein the fixture includes two lateral edges engaged with the two plates, respectively, and is prevented from sliding relative to the two plates.

12. The combination of the tire tool and tool set as claimed in claim 11, wherein the fixture includes a first surface and a second surface opposite to the first surface, and wherein the tire lever is supported on the first surface when received between the two plates of the housing member.

13. The combination of the tire tool and tool set as claimed in claim 12, wherein the second surface includes a plurality of channels inset thereon, and wherein the plurality of tools is receivable in the plurality of channels, respectively.

14. The combination of the tire tool and tool set as claimed in claim 11, wherein the tire tool is pivotal away from the housing member upwardly and the plurality of tools are pivotal away from the housing member downwardly.

15. The combination of the tire tool and tool set as claimed in claim 11, wherein the fixture includes a hook defined thereon and resiliently moveable between a first position with the hook engaging with the tire lever to prevent the tire lever from accidentally disengaging from the fixture and a second position with the hook disengaged from the tire lever to allow the tire lever to be released from the fixture, and wherein one of the two plates includes a recess inset therein and disposed corresponding to the hook in order to provide a space allowing an engaging end of the hook to move out of the tire lever.

* * * * *